US005467866A

United States Patent [19]

Swinderman

[11] Patent Number: 5,467,866
[45] Date of Patent: Nov. 21, 1995

[54] CONVEYOR IMPACT PILLOW

[75] Inventor: R. Todd Swinderman, Kewanee, Ill.

[73] Assignee: Martin Engineering Company, Neponset, Ill.

[21] Appl. No.: 158,510

[22] Filed: Nov. 29, 1993

[51] Int. Cl.$^6$ .................................................. B65G 15/60
[52] U.S. Cl. ............................................ 198/841; 198/823
[58] Field of Search ...................................... 198/823, 841

[56] References Cited

U.S. PATENT DOCUMENTS

| 4,359,156 | 11/1982 | Austin | 198/841 |
| 4,789,056 | 12/1988 | Bourbeau | 198/841 |
| 4,793,470 | 12/1988 | Andersson . | |
| 4,898,272 | 2/1990 | Swinderman et al. . | |
| 4,932,516 | 6/1990 | Andersson . | |
| 5,007,528 | 4/1991 | Hideharu | 198/841 |
| 5,103,967 | 4/1992 | Stoll . | |
| 5,131,530 | 7/1992 | Rappen | 198/841 |
| 5,368,154 | 11/1994 | Campbell | 198/841 |

Primary Examiner—Joseph E. Valenza
Attorney, Agent, or Firm—Lee, Mann, Smith, McWilliams, Sweeney & Ohlson

[57] ABSTRACT

An impact pillow for resiliently supporting a conveyor belt in an impact zone in a conveyor transfer point. The impact pillow includes a base wall, first and second side walls each extending upwardly from said base wall to a top edge, and first and second end walls each extending upwardly from said base to a top edge and between said side walls. A top wall extends from and between the top edges of the side walls and the end walls forming a support surface over which the conveyor belt slides. The top wall, base wall, end walls and side walls combine to form an integral shell having a closed cushioning chamber adapted to receive and contain a cushioning substance. The cushioning substance may be a gas, a fluid or a resilient solid material. The impact pillow resiliently supports the moving conveyor belt as material is loaded onto the conveyor belt at the transfer point and absorbs the impact forces generated on the conveyor belt during the loading process. Different types of cushioning substances may be utilized in the cushioning chamber to selectively adjust the resistance of the impact pillow to deformations from the impact forces.

15 Claims, 2 Drawing Sheets

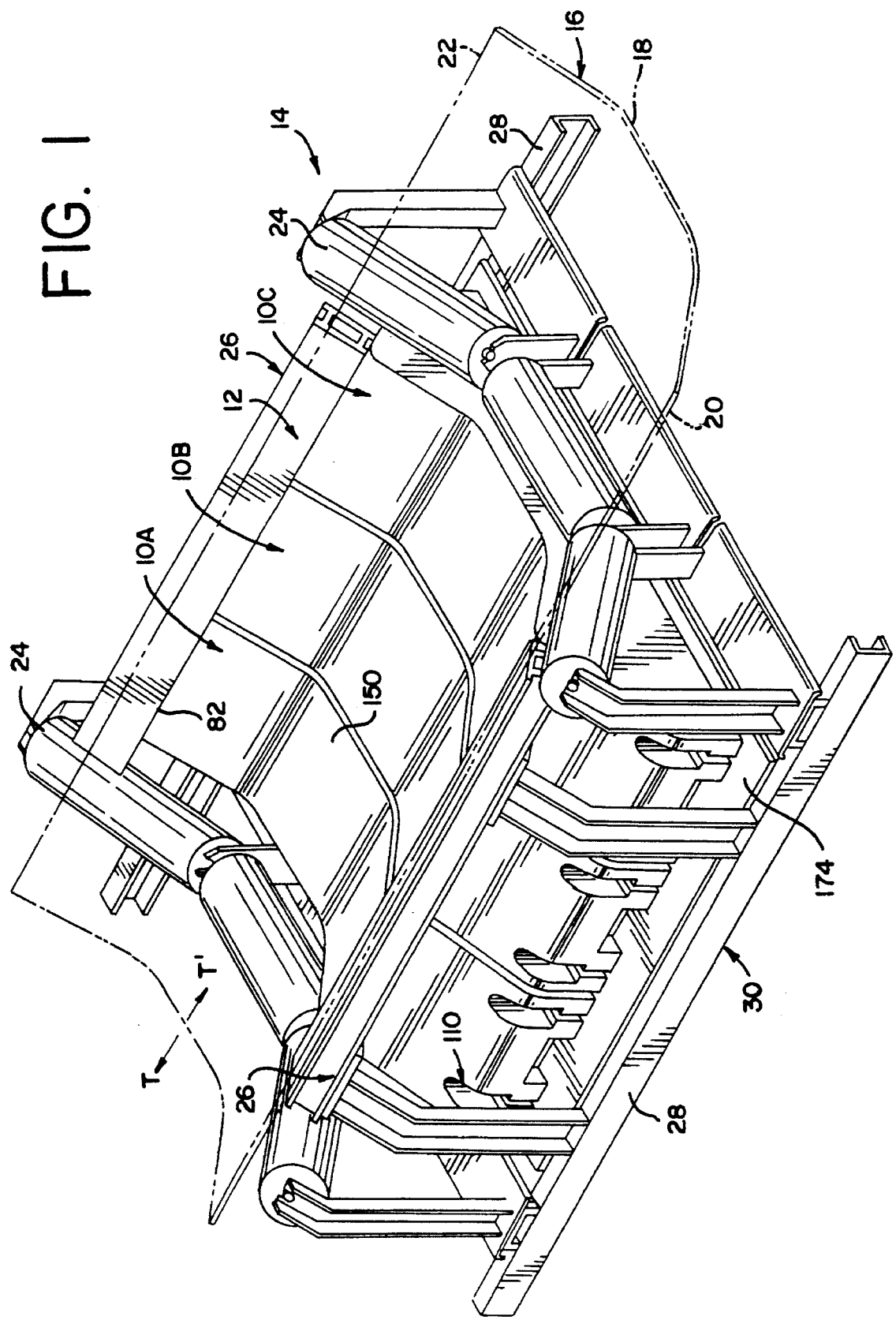

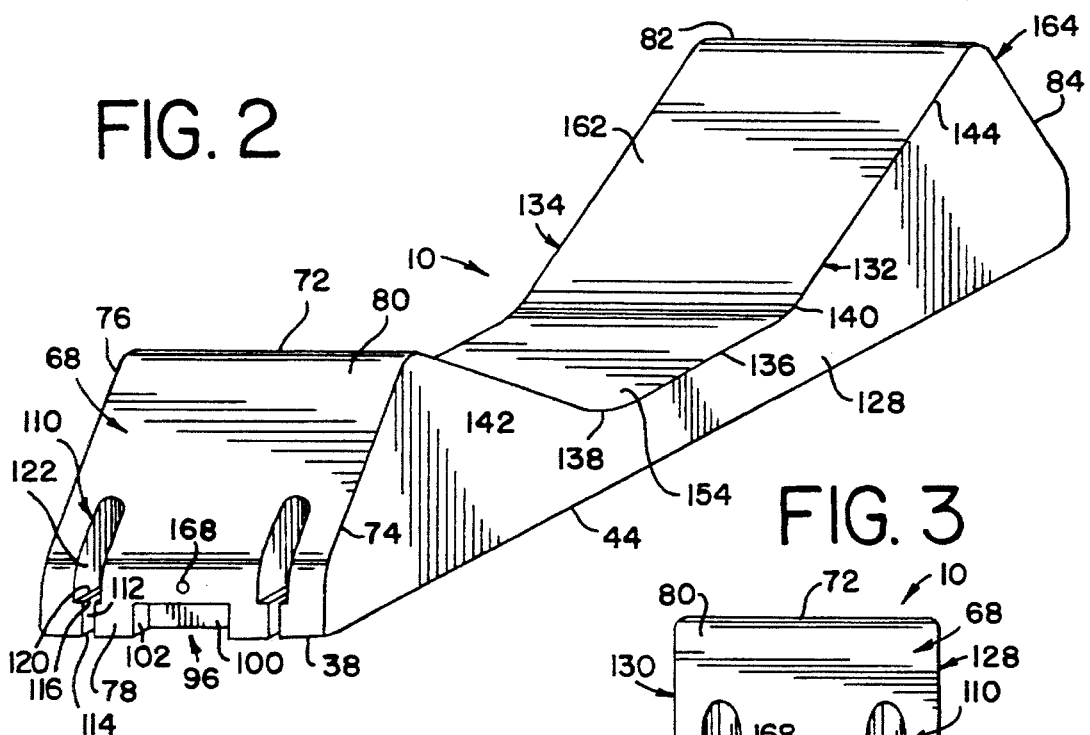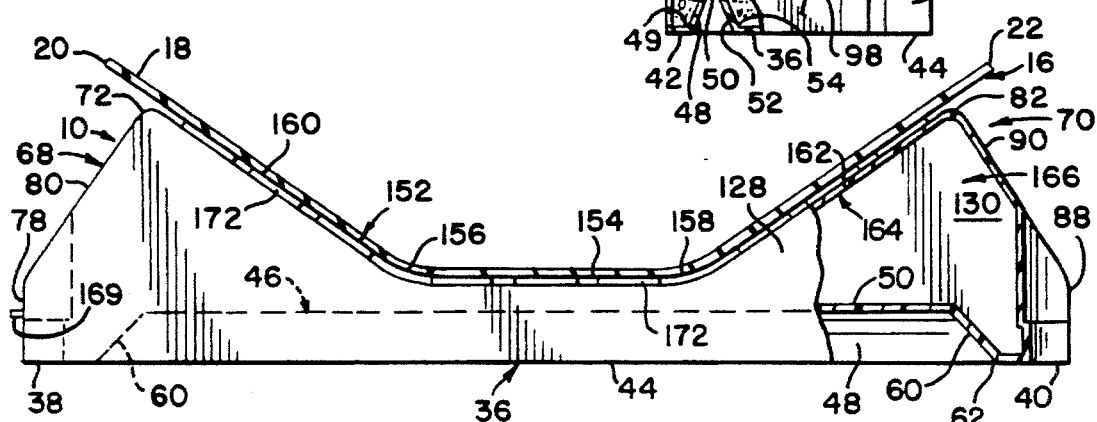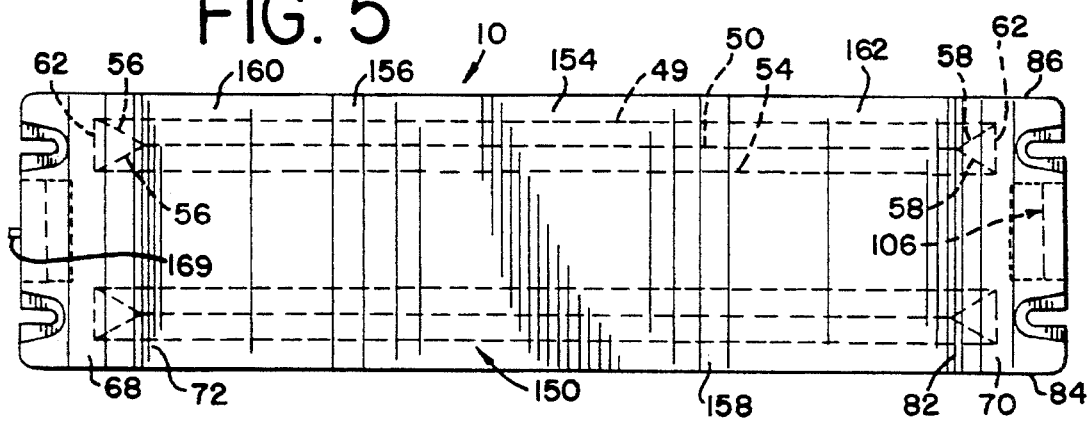

CONVEYOR IMPACT PILLOW

BACKGROUND OF THE INVENTION

The present invention relates to a conveyor belt support mechanism which is used to resiliently support a conveyor belt during loading and in particular to a conveyor belt support mechanism having a resistance to deformation by compression or flexure which resistance may be adjusted to meet particular operating conditions.

The belt of a conveyor is loaded with the material to be conveyed in an impact zone of a transfer point. The load material may be sand, gravel, coal, boulders, logs or other large or lumpy material masses. The vertical distance the load material falls as it is loaded onto the belt may vary from a few feet, such as when the material is loaded from the bucket of an end loader, to distances greater than thirty feet when the material is loaded through a conveyor chute. As the load material drops onto the belt the load material creates impact forces on the belt. The magnitude of the impact forces will vary depending upon the mass of the load material and the velocity of the load material when it impacts the belt. The impact forces applied to the belt during loading stretch the belt and create cracks, tears and other damage to the belt. The impact forces also result in excessive belt sag which breaks the seal between the edges of the belt and the lower edges of the conveyor skirtboards which contain the load material on the belt during loading. This allows an increase in the amount of load material which falls off of the belt over the side edges during loading. High impact forces in the load zone damage conventional impact rollers, shafts, and bearings.

Conveyor belt support mechanisms such as impact cradles have previously been used to support the belt of a conveyor in the impact zone of a transfer point. One such cradle is the GUARDABELT® impact cradle manufactured and sold by Martin Engineering of Neponset, Ill., the applicant herein. Such impact cradles typically include a plurality of metal beams including a T-shaped web and flange which extend longitudinally or transversely underneath the upper run of the belt in the impact zone of the transfer point. A bar or block of solid rubber having a T-shaped slot in its lower surface is slidably mounted on each beam with the T-shaped web and flange being located within the T-shaped slot. The upper surface of the rubber block may be coated with a low friction material such as ultra high molecular weight polyethylene to provide a low friction surface over which the belt slides.

SUMMARY OF THE INVENTION

The present invention provides an impact pillow for resiliently supporting a conveyor belt in the impact zone of a conveyor transfer point. The impact pillow includes a generally planar base wall including one or more reinforcing ribs for stiffening the base wall. A first side wall and a second side wall each extend upwardly from opposite edges of the base wall. Each side wall includes a top edge. A first end wall and a second end wall each extend upwardly from opposite edges of the base wall and extend between the first and second side walls. Each end wall includes a top edge. A top wall extends from and between the top edges of the first and second side walls and the first and second end walls thereby forming a support surface over which the conveyor belt slides. The top wall, base wall, first and second end walls, and first and second side walls combine to form a shell having a closed cushioning chamber. The chamber is adapted to receive and contain a cushioning substance through a closeable aperture in the shell. The impact pillow is located below the upper load carrying run of the conveyor belt in the impact zone of the conveyor transfer point such that the impact pillow resiliently supports the moving conveyor belt as material is loaded onto the conveyor belt and absorbs impact forces applied to the conveyor belt by the load material during the loading process.

The cushioning substance which is introduced into the cushioning chamber of the impact pillow may be a fluid or a resilient solid (nongaseous and nonliquid) material. The cushioning fluid may be a gas such as air or a liquid such as water or a water and antifreeze mixture. The resilient solid material may be any of a number of types of resilient materials including foam-type materials such as a closed cell polyurethane foam or a flexible PVC foam. The rigidity of the impact pillow, its resistance to compressive and flexural deformations caused by the absorption of the loading impact forces, may be adjusted for the particular operating conditions of a load and transfer point by selecting the appropriate type of cushioning substance to fill the cushioning chamber. In addition, when the chamber is filled with a gas such as air, the gas may be pressurized to various different pressures as desired to vary the rigidity of the impact pillow. The rigidity or resistance of the impact pillow to deformation may thereby be incrementally adjusted from relatively soft and compressible to hard and stiff as desired and as the operating conditions warrant.

DESCRIPTION OF THE DRAWINGS

FIG. 1 is a perspective view showing three impact pillows of the present invention installed in a conveyor in the impact zone of a conveyor transfer point.

FIG. 2 is a perspective view of the impact pillow of the present invention.

FIG. 3 is an end elevational view of the impact pillow including a partially broken away cross-section.

FIG. 4 is a side elevational view of the impact pillow including a partially broken away cross-section.

FIG. 5 is a top plan view of the impact pillow.

DESCRIPTION OF THE PREFERRED EMBODIMENT

FIG. 1 shows three impact pillow conveyor belt support mechanisms 10A, 10B and 10C located side-by-side in the loading or impact zone 12 of a transfer point for a conveyor mechanism 14. The conveyor mechanism 14 includes a conveyor belt 16 having an upper run 18 on which the load material to be conveyed is carried and a lower return run (not shown). The conveyor belt 16 extends transversely between a first edge 20 and a generally parallel second edge 22. The conveyor belt 16 is an endless belt generally made of reinforced rubber-like materials including one or more splices. The belt 16 rotates about a head pulley and a tail pulley (not shown) in a circular manner. The direction of rotation of the belt 16 may be reversible such that the upper run 18 of the conveyor belt 16 moves in a longitudinal direction in either the direction as shown by the arrow T in FIG. 1 or the opposite direction as shown by the arrow T'. The belt 16 moves over idler rollers 24 which extend transversely below the upper run 18. Each edge 20 and 22 of the upper run 18 is supported in the impact zone 12 of the transfer point by a side rail 26 which extends below the upper run 18 longitudinally to the conveyor belt 16. The side rails 26 are preferably of the type described in U.S. Pat. No.

4,898,272 and as manufactured and sold by Martin Engineering of Neponset, Ill., the applicant herein. The side rails 26 support the edges 20 and 22 of the upper run 18 in close proximity to a conveyor skirtboard of the type shown in U.S. Pat. Nos. 4,874,082 or 5,016,747 also owned by Martin Engineering to prevent load material from spilling over the side edges 20 and 22 of the belt 16 as it is loaded onto the belt 16 in the impact zone 12. The idler rollers 24 and side rails 26 are supported on a pair of parallel and spaced apart stringers 28 which extend longitudinally along the path of the conveyor belt 16 and which form part of the stationary frame 30 of the conveyor mechanism 14.

As best shown in FIGS. 3 and 4, the impact pillow 10 includes a generally planar base wall 36 which extends transversely to the belt 16 between a first edge 38 and a generally parallel and spaced apart second edge 40. The base wall 36 also extends longitudinally to the belt 16 between a third edge 42 and a generally parallel and spaced apart fourth edge 44. The edges 38, 40, 42 and 44 are all generally linear. The first and second edges 38 and 40 are generally perpendicular to the third and fourth edges 42 and 44 such that the base wall 36 is generally rectangular as viewed in plan.

The base wall 36 may include one or more reinforcing ribs 46 extending transversely between the first edge 38 and the second edge 40 for stiffening the base wall 36. Each reinforcing rib 46 is preferably integrally molded as a portion of the base wall 36 in the form of an inverted "V" as best shown in FIG. 3. Each reinforcing rib 46 includes a first wall 48 extending upwardly from a lower edge 49 adjoining the base wall 36 to a vertex edge 50 at an acute angle to the base wall 36. The reinforcing rib 36 also includes a second wall 52 which extends upwardly from a lower edge 54 adjoining the base wall 36 to the vertex edge 50 at an acute angle to the base wall 36. The second wall 52 is connected to the first wall 48 along the vertex edge 50. The first and second walls 48 and 52 extend substantially the entire length of the base wall 36 between a first edge 56 sloped at an acute angle to the base wall 36 and a second edge 58 sloped at an equal angle but in an opposite direction to the first edge 56. Each reinforcing rib 46 also includes a generally triangular end wall 60. Each triangular end wall 60 includes a lower edge 62 adjoining the base wall 36 and which extends perpendicular to and between the lower edges 49 and 54 of the walls 48 and 52. Each triangular end wall 54 extends from the lower edge 62 and between the first wall 48 and the second wall 52 at an acute angle to the base wall 36. Various other configurations for the ribs 46 may be used as desired.

The impact pillow 10 also includes a first end wall 68 and a spaced apart second end wall 70. The first end wall 68 adjoins the first edge 38 of the base wall 36 and extends upwardly therefrom to a top edge 72. The first end wall 68 also extends between a first generally vertical edge 74 extending upwardly from the intersection of the first edge 38 and the fourth edge 44 of the base wall 36 and a spaced apart and parallel generally vertical edge 76 extending upwardly from the intersection of the first edge 38 and the third edge 42 of the base wall 36. The first end wall 68 includes a generally planar lower wall portion 78 extending vertically upward from the first edge 38 and a sloped generally planar upper wall portion 80 which extends between the top of the lower wall portion 78 and the top edge 72.

The second end wall 70 extends upwardly from the second edge 40 of the base wall 36 to a top edge 82. The second end wall 70 also extends between a generally vertical first edge 84 which extends upwardly from the intersection of the second edge 40 and the fourth edge 44 of the base wall 36 and a spaced apart and parallel generally vertical edge 86 which extends upwardly from the intersection of the second edge 40 and the third edge 42 of the base wall 36. The second end wall 70 includes a generally planar lower wall portion 88 which extends vertically upward from the second edge 40 of the base wall 36. The second end wall 70 also includes a generally planar and sloped upper wall portion 90 which extends between the top of the lower portion 88 and the top edge 82. While the upper wall portions 80 and 90 of the end walls 68 and 70 are preferably inwardly sloped, they may also be vertical and coplanar with the lower wall portions 78 and 88 if desired.

The first end wall 68 includes a recessed handle 96. The handle 96 is formed by an upper wall 98 which is generally planar and which extends horizontally inwardly from the lower wall portion 78. A generally planar inner wall 100 extends vertically between the interior edge of the upper wall 98 and the base wall 36. A generally planar end wall 102 extends vertically between the base wall 36, lower wall portion 78 and one end of the upper wall 98 and inner wall 100. A second generally planar end wall 104 is spaced apart and parallel to the end wall 102 and extends between the base wall 36, the lower wall portion 78 and a second end of the upper wall 98 and inner wall 100. A recessed handle 106, which is identical in construction to the handle 96, is formed in the lower wall portion 88 of the second side wall 70.

The impact pillow 10 preferably includes one or more tie-down structures 110 located in each end wall 68 and 70. Each tie-down structure 110 includes a lower generally U-shaped wall which extends vertically upwardly from a lower U-shaped edge 114 located in the base wall 36 and an upper U-shaped edge 116 spaced vertically thereabove, and extends inwardly from the lower wall portion 78 or 88. A generally planar shelf 118 extends horizontally outwardly from the upper U-shaped edge 116 to an outer U-shaped edge 120. An upper generally U-shaped wall 122 extends vertically upwardly from the outer U-shaped edge 120 of the shelf 118 to the upper wall portion 80 or 90. The lower U-shaped wall 112 forms a slot for the receipt of a threaded stud or shank of a bolt (not shown) adapted for attachment to the conveyor frame 30. The upper U-shaped wall 122 forms a recess adapted to receive a washer and a threaded nut (not shown) for attachment to the threaded stud and for engagement against the shelf 118 to clamp the impact pillow 10 to the frame 30.

The impact pillow 10 also includes a first side wall 128 and a second side wall 130. The first side wall 128 is generally planar and extends upwardly generally vertically from the fourth edge 44 of the base wall 36 to a top edge 132 and laterally between the vertical edge 74 of the first end wall 68 and the vertical edge 84 of the second end wall 70. The second side wall 130 is generally planar and extends upwardly generally vertically from the third edge 42 of the base wall 36 to a top edge 134 and laterally between the vertical edge 76 of the first end wall 68 and the vertical edge 86 of the second end wall 70. The first side wall 128 and the second side wall 130 are generally parallel and spaced apart from one another. The top edges 132 and 134 of the side walls 128 and 130, as best shown in FIGS. 2 and 4, are generally U-shaped having a generally linear and horizontal center portion 136 extending between a curved portion 138 and a curved portion 140 at each end of the center portion 136. The top edges 132 and 134 also include a generally linear outer portion 142 extending between the curved portion 138 and the top edge 72 of the first end wall 68. The top edges 132 and 134 also include a generally linear outer portion 144 which extends between the curved portion 140 and the top edge 82 of the second end wall 70. The outer portions 142 and 144 of the top edges 132 and 134 are sloped at an acute angle to the center portion 136.

The impact pillow 10 also includes a top wall 150 which extends from and between the top edge 80 of the first wall 68, the top edge 82 of the second wall 70, the top edge 132 of the first side wall 128 and the top edge 134 of the second side wall 130. The top wall 150 includes an outer support surface 152 over which the conveyor belt 16 may slide. As best shown in FIGS. 2 and 4, the top wall 150 is generally U-shaped and includes a generally planar center wall portion 154 which extends generally horizontally and longitudinally between the center portions 136 of the top edges 132 and 134 of the side walls 128 and 130. The top wall 150 also includes a curved wall portion 156 which extends between the curved portions 138 of the side walls 128 and 130 and a curved wall portion 158 which extends between the curved portions 140 of the side walls 128 and 130. The center wall portion 154 of the top wall 150 extends laterally between the curved wall portions 156 and 158. The top wall 150 also includes a generally planar outer wall portion 160 which extends longitudinally between the outer portions 142 of the top edges 132 and 134 and laterally between the curved wall portion 156 and the top edge 72 of the first side wall 68. The top wall 150 also includes a generally planar outer wall portion 162 which extends longitudinally between the outer portions 144 of the top edges 132 and 134 and laterally between the curved wall portion 158 and the top edge 82 of the second end wall 70. The outer wall portions 160 and 162 of the top wall 150 are sloped at an acute angle to the center wall portion 154 in a mirror-image of one another.

As best shown in FIG. 4 the top wall 150 extends laterally to the conveyor belt 16 between the top edge 72 of the first end wall 68 and the top edge 82 of the second end wall 70. The top edges 72 and 82 are preferably spaced inwardly from the edges 20 and 22 of the conveyor belt 16 such that the edges 20 and 22 may be supported by the side rails 26. The upper wall portions 80 and 90 of the end walls 68 and 70 are preferably perpendicular to the outer wall portions 160 and 162 of the top wall 150. As best shown in FIG. 4, the conveyor belt 16 conforms to the cross-sectional shape of the top wall 150 when the belt is loaded. While the top wall 150 is shown as being generally U-shaped in FIGS. 2 and 4, the top wall 150 may be entirely planar, may be in the shape of an arc of a circle or in various other curvilinear cross-sectional shapes as desired. Similarly, the base wall 36, the end walls 68 and 70, and the side walls 128 and 130, while shown as being planar or as including planar portions, may each be curved and may include various curved and planar portions.

The base wall 36, first and second end walls 68 and 70, first and second side walls 128 and 130, and the top wall 150 combine to form an integral shell 164 having a closed cushioning chamber 166 best shown in the broken away portion of FIG. 4. The shell 164 preferably includes a port 168 which is selectively openable and closeable for providing selective access to the chamber 166. The port 168 may be formed by an aperture in the shell 164 which is closeable by a removable cap, a valve 169, or other well known devices for selectively opening and closing an aperture. As best shown in FIG. 3, the cushioning chamber 166 of the shell 164 may be selectively filled through the port 168 with a cushioning substance 170. The cushioning substance 170 may be a fluid, either a liquid or a gas, or various different types of resilient solid materials. When the cushioning substance 170 is a gas such as air, various amounts of air may be introduced into the chamber 166 through the port 168 such that the pressure of the air within the shell 164 is adjusted to various different pressures as desired, normally at or above atmospheric pressure. As the pressure of the gas within the shell 164 is increased, the rigidity and resistance of the impact pillow 10 to deformation from the loading impact forces also increase. The cushioning substance 170 may also be a liquid such as water, a water and antifreeze mixture, or oil. The cushioning substance 170 may also be a resilient solid material including foams such as a closed cell polyurethane foam or a flexible PVC foam. The cushioning substance 170 is selected for the rigidity characteristics it will provide to the impact pillow 10 as required by the operating conditions in which the impact pillow 10 is intended for use.

One or more insert pad members 172 best shown in FIG. 4 may be attached to the outer support surface 152 of the top wall 150. The pad members 172 are preferably made of ultra high molecular weight polyurethane to provide a slick low friction surface over which the conveyor belt 16 may slide. The pad members 172 also provide a protective wear surface to prevent wear of the top wall 150. As the pad members 172 wear thin through the friction created between the belt 16 and the pad members 172, the worn pad members 172 may be removed from the top wall 150 and replaced with new pad members 172.

One or more impact pillows 10 are removably mounted to the stationary frame 30 of the conveyor mechanism 14 by threaded fasteners which extend through the recess in the lower U-shaped walls 112 in the tie-down structures 110 and a threaded nut which engages the fastener and the shelf 118 of the tie-down structure to clamp the impact pillow in engagement with the frame 30. The impact pillow 10 may be supported at each edge 38 and 40 of the base wall 36 or may be supported across its entire length between the stringers 28 by a plate 174 as shown in FIG. 1. The impact pillow 10 may also be supported at each edge 38 and 40 by a rubber block (not shown) placed between the stringers 28 and the edges 38 and 40. The rubber block is typically one inch thick of 40 durometer natural rubber. One or more rubber blocks of various thicknesses may be used as shims to adjust the impact pillow 10 to the desired height.

The outer support surface 152 of the top wall 150, or the top surface of the pad members 172 if pad members 172 are being used, is preferably placed approximately one-inch below the unloaded travel line of the upper run 18 of the belt 16 in the impact zone 12 of the conveyor transfer point. This gap allows the impact pillow 10 to absorb the impact forces generated on the belt 16 when the belt 16 is loaded as the belt will sag slightly into contact with the impact pillow 10. However, when the belt 16 is running empty the gap avoids the continuous friction and wear caused by the sliding engagement of the belt 16 with the impact pillow 10 when the belt 16 is loaded. As the first and second side walls 128 and 130 of the impact pillow 10 are substantially planar and vertical, the top wall 150 of an impact pillow 10 may be placed closely adjacent to the top wall 150 of another impact pillow 10 to provide a substantially uninterrupted support surface. The top edges 132 and 134 of the first and second side walls 68 and 70 and of the top wall 150 may be curved or beveled to prevent a conveyor belt splice from catching against the first or second side walls 128 or 130 of the impact pillow, no matter which direction the conveyor belt 16 is rotating.

The shell 164 is preferably integrally molded in a rotational molding process from a rigid material such as high density polyethylene. The thickness of the top wall 150, the base wall 136, the first and second end wall 68 and 70, and the first and second side walls 128 and 130 between their inner and outer surfaces may be varied to provide the impact pillow 10 with a desired preselected rigidity or resistance to deformation from the loading impact forces to meet the particular operating conditions in which the impact pillow 10 is intended to operate. In addition, the type of cushioning substance 170 which is used to fill the cushioning chamber 166 may be selected from various different types of substances, each of which also provides a different rigidity or cushioning characteristic to the impact pillow 10. When operating conditions change, the rigidity or cushioning characteristic of the impact pillow 10, its ability to compress, flex and absorb shock and impact forces, may be adjusted, for example, by increasing or decreasing the pressure of the gas within the cushioning chamber 166 or by replacing the gas with a liquid or a solid resilient material.

The impact pillow 10 is installed such that under normal running conditions a gap will exist between the upper surface 152 of the impact pillow 10, or the pad members 172, and the conveyor belt 16. The gap will be of sufficient dimension however so that when high impact forces are placed upon the belt 16 at the transfer point during loading the gap will temporarily diminish to zero and the impact pillow 10 will support and cushion the moving belt 16 until the belt 16 returns to its normal operating position and the gap or clearance returns to its established dimension.

As load material is dropped onto the conveyor belt 16 in the impact zone 12, the belt 16 will deflect downwardly into sliding engagement with the outer support surface 152 of the top wall 150 or the pad members 172 if used. The impact forces generated on the belt 16 by the falling load material will cause the top wall 150 to bend and flex and thereby compress the underlying cushioning substance 170 within the shell 164. The end walls 68 and 70 and the side walls 128 and 130 will also flex. The bending and flexure of the top wall 150, the end walls 68 and 70 and the side walls 128 and 130, along with the compression of the cushioning substance 170, act to absorb the impact forces generated on the conveyor belt 16 during loading. Simultaneously, the top wall 150, or the pad members 172, provides a slick low friction support surface over which the belt 16 may slide during loading to prevent excessive sagging and stretching of the belt 16 without undue friction or wear to the belt 16.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. An impact pillow for supporting a conveyor belt in the impact zone of a conveyor transfer point including a shell having an upper support surface over which the conveyor belt slides and a substantially enclosed cushioning chamber defined interior to said shell, said chamber adapted to receive and contain a cushioning substance, said shell adapted to substantially enclose the cushioning substance within said cushioning chamber, said shell including a port in communication with said cushioning chamber, whereby said impact pillow resiliently supports the moving conveyor belt as material is loaded onto the conveyor belt at the transfer point and absorbs impact forces on the conveyor belt during the loading process.

2. The impact pillow of claim 1 wherein said cushioning chamber includes a cushioning substance.

3. The impact pillow of claim 1 wherein said shell is made of polyethylene.

4. The impact pillow of claim 1 wherein said shell includes a peripheral wall extending downwardly from said upper support surface.

5. The impact pillow of claim 4 wherein said shell includes a base attached to said peripheral wall enclosing said cushioning chamber.

6. The impact pillow of claim 5 wherein said base of said shell includes a rib for stiffening said base.

7. The impact pillow of claim 1 including means for selectively opening and closing said port.

8. The impact pillow of claim 7 wherein said means for opening and closing said port comprises a valve.

9. The impact pillow of claim 1 wherein said upper support surface of said shell includes a generally horizontal center wall portion, a first upwardly sloped outer wall portion extending from a first edge of said center wall portion, and a second upwardly sloped outer wall portion extending from a second edge of said center wall portion, said first and second outer wall portions being located on opposite sides of said center wall portion.

10. The impact pillow of claim 9 wherein said center wall portion is substantially planar and generally horizontal, said first outer wall portion is substantially planar and located at an acute angle to said center wall portion, and said second outer wall portion is substantially planar and is located at an acute angle to said center wall portion.

11. An impact pillow for supporting a conveyor belt in the impact zone of a conveyor transfer point including a shell having an upper support surface over which the conveyor belt slides and a cushioning chamber defined interior to said shell, said chamber adapted to receive and contain a cushioning substance, and at least one wear pad member attached to said upper support surface of said shell for providing wear protection to said shell from the conveyor belt, whereby said impact pillow resiliently supports the moving conveyor belt as material is loaded onto the conveyor belt at the transfer point and absorbs impact forces on the conveyor belt during the loading process.

12. The impact pillow of claim 11 wherein said pad member is removably attached to said upper support surface of said shell.

13. The impact pillow of claim 4 wherein said peripheral wall of said shell includes a recess forming a shelf adapted to engage a fastener for connecting said impact pillow to a frame for the conveyor belt.

14. The impact pillow of claim 5 wherein said peripheral wall of said shell includes a handle formed by an inwardly projecting generally horizontal upper wall spaced above said base and a generally vertical inner wall extending between said upper wall and said base, said handle facilitating manual movement of said impact pillow during installation.

15. The impact pillow of claim 1 including means for closing said port such that said shell substantially seals said cushioning chamber.

* * * * *